Oct. 13, 1925. Re. 16,185

J. G. NIKART

LUNCH KIT

Original Filed June 12, 1922

INVENTOR.
JOSEPH G. NIKART.
BY HIS ATTORNEYS.
Williamson, Reif & Williamson

Reissued Oct. 13, 1925. Re. 16,185

UNITED STATES PATENT OFFICE.

JOSEPH G. NIKART, OF VIRGINIA, MINNESOTA.

LUNCH KIT.

Original No. 1,460,108, dated June 26, 1923, Serial No. 567,611, filed June 12, 1922. Application for reissue filed February 11, 1925. Serial No. 8,564.

*To all whom it may concern:*

Be it known that I, JOSEPH G. NIKART, a citizen of Lithuania, residing at Virginia, in the county of St. Louis and State of Minnesota, have invented certain new and useful Improvements in Lunch Kits, of which the following is a specification.

This invention relates to improvements in lunch kits and has for its objects to provide a device wherein danger of the kit accidentally opening and expelling the contents is effectually avoided.

Another object is to provide means for expelling the drawer of the kit when the same is released.

A further object of the invention is to provide a latch which will hold the drawer closed against the influence of opening means so as to avoid accidental opening until released by the user.

These and other analogous objects are attained by the novel design, construction and arrangement of parts hereinafter described and shown in the accompanying drawing, forming an essential part of this disclosure, and in which:—

Figure 1:
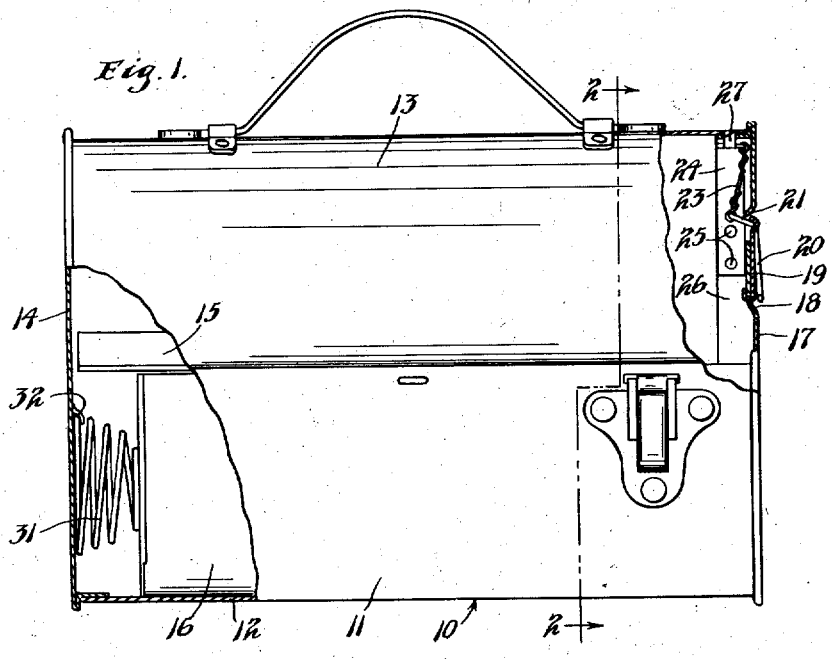
Fig. 1 is a side view of a lunch kit constructed in accordance with this invention, showing portions broken away to more clearly illustrate the details of construction.
Figure 2:
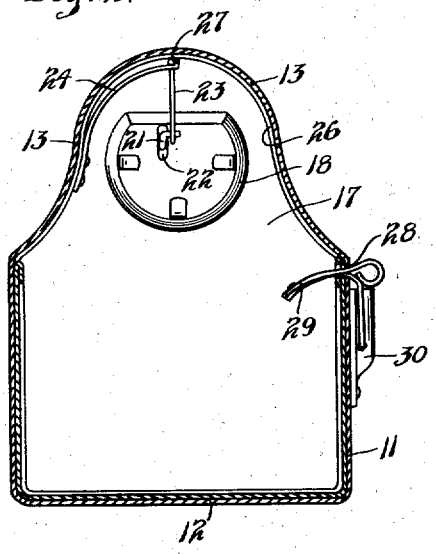
Fig. 2 is a vertical sectional view taken on line 2—2 of Fig. 1.
Figure 3:
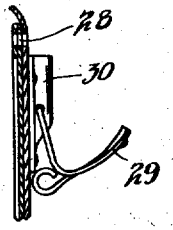
Fig. 3 is a fragmentary view of the side of the kit showing the locking device in unlocked position.

Referring to the drawing, the numeral 10 designates the outer shell of the device which comprises a pair of parallel sides or walls 11 connected at the lower edges by a bottom wall 12 and at their upper edges to a top member 13, arched as illustrated, to accommodate a vacuum bottle. As shown in the drawing, the shell is closed at one end by a wall 14, while the opposite end is left open and intermediate the top and bottom of the shell, is a partition 15, upon which the vacuum bottle rests.

Fitted into the open end of the shell is a drawer structure 16 beneath the partition 15, as illustrated in Fig. 1.

The front wall 17 of the drawer structure 16 projects upwardly forming a closure for the upper portion of the shell, as will be clearly seen upon reference to the drawings. Formed intermediate the upper and lower ends of the projecting portion of the front wall 17, is a depression 18 for the reception of a plate 19 by means of which a link handle 20 is pivotally connected to the wall 17.

As shown, this handle is provided with an arm 21 extending through a slot 22 formed in the bottom wall of the depression 18 and secured to the inner end of the arm is a connecting element 23, its opposite end being attached to the free end of a leaf spring 24, secured as at 25, to the inwardly projecting flange 26 of the wall 17.

The free end of the spring is provided with an upturned latch finger 27, adapted to engage in an opening formed in the upper wall or top member of the shell, adjacent its open end. It will thus be seen that, as the drawer structure is entered into the shell to its full extent, the finger 27 will engage in the opening and accidental removal of the drawer from the shell will be prevented.

In order to further lock the drawer in the shell, there are provided in the side wall of the shell, and in the side wall of the drawer, matching openings 28, for the reception of the locking tongue 29 of a suitable fastener 30.

If so desired, a compression spring 31 may be attached, as at 32, to the inner side of the wall 14 in such manner that its outer end will engage the inner end of the drawer structure when the same is in place, and exert pressure thereon to aid in the removal of the drawer from the shell.

While certain preferred embodiments of this device have been shown and described, it will be understood that changes in the form, arrangements, proportions, sizes and details thereof, may be made without departing from the scope of the invention as defined in its broadest aspect.

What is claimed is:

1. A lunch kit comprising an outer shell, a container fitted into the outer shell, a handle for withdrawing the container from the outer shell, means connected with the handle and actuated upon movement thereof into withdrawing position to unlock said container within the shell, auxiliary locking means to hold the device in assembled position, and means for urging the container out of the shell when the locking means is released and said handle raised.

2. A lunch box having in combination, an outer casing having an open end, a drawer-like member slidable into said casing and having an end portion closing said open end of said casing, a locking means for said drawer-like member resiliently held in locked position, and a revoluble handle means carried by said end portion of said drawer-like member adapted to be turned and pulled upon for unlocking and withdrawing, respectively, said drawer-like member.

3. A lunch box having in combination, an outer casing having an open end, a drawer-like member slidable into said casing and having an end portion closing said open end of said casing, and having a part extending into said casing a short distance, said casing having an aperture at its top and said member having an opening in said part alining with said aperture, a latch adapted to enter said opening and aperture, resilient means carrying said latch and urging the same through said opening, and a member revolubly mounted in said end portion of said first mentioned member extending therethrough and connected to said resilient means to act therein to withdraw said latch and forming a handle to withdraw said first mentioned member from said casing.

4. A lunch box having in combination, an outer casing having an open end, a drawer-like member slidable into said casing and having an end portion closing said open end of said casing, and having a slot therethrough, a single handle formed as a revoluble crank member mounted on and having a handle on the outer side of said end portion and extending through said slot, a locking means for said member connected to said crank member, so that rotation of said handle moves said locking means to unlocked position and said first mentioned member may be withdrawn from said casing by said handle.

5. A lunch box having in combination, an outer casing having an open end, a drawer-like member slidable into said outer casing and having an end portion closing said open end thereof, a spring lock carried by said drawer-like member at the inner side of its front wall adapted to engage said casing to hold said drawer-like member in closed position, a revoluble handle carried by said end portion of said drawer-like member and extending therethrough, and a single member connecting said handle and lock whereby, when said handle is turned, said lock is released and said handle may be pulled upon to open said drawer.

6. A lunch box having in combination, an outer casing having an open end, a drawer-like member slidable into said casing and having an end portion closing said open end of said casing, a locking means for said drawer-like member resiliently held in locked position, and a single handle means carried by said end portion of said drawer-like member directly connected to said locking means and adapted to be turned and pulled upon respectively to unlock and withdraw said drawer-like member.

In testimony whereof, I affix my signature.

JOSEPH G. NIKART.